US012589397B2

(12) United States Patent
Fraefel et al.

(10) Patent No.: US 12,589,397 B2
(45) Date of Patent: Mar. 31, 2026

(54) WEAR-RESISTANT ROTOR

(71) Applicant: Bühler AG, Uzwil (CH)

(72) Inventors: Cornel Fraefel, Flawil (CH); Eduard Nater, Zuckenriet (CH)

(73) Assignee: BÜHLER AG, Uzwil (CH)

( * ) Notice: Subject to any disclaimer, the term of this patent is extended or adjusted under 35 U.S.C. 154(b) by 413 days.

(21) Appl. No.: 18/547,098

(22) PCT Filed: Feb. 17, 2022

(86) PCT No.: PCT/EP2022/025055
§ 371 (c)(1),
(2) Date: Aug. 18, 2023

(87) PCT Pub. No.: WO2022/179750
PCT Pub. Date: Sep. 1, 2022

(65) Prior Publication Data
US 2024/0042454 A1 Feb. 8, 2024

(30) Foreign Application Priority Data
Feb. 24, 2021 (EP) .................................... 21158944

(51) Int. Cl.
*B02C 17/16* (2006.01)

(52) U.S. Cl.
CPC ........ *B02C 17/163* (2013.01); *B02C 2210/02* (2013.01)

(58) Field of Classification Search
CPC ....... B02C 17/16; B02C 17/163; B02C 17/18; B02C 17/20; B02C 17/22; B02C 17/225; B02C 2017/165; B02C 2210/02
See application file for complete search history.

(56) References Cited

FOREIGN PATENT DOCUMENTS

| | | | | |
|---|---|---|---|---|
| CH | 715322 A2 | 3/2020 | | |
| CN | 110328021 A | 10/2019 | | |
| CN | 110893370 A | 3/2020 | | |
| DE | 102014101727 B3 * | 3/2015 | ............ | B02C 17/20 |
| EP | 1992412 A1 | 11/2008 | | |
| WO | 2016082812 A1 | 6/2016 | | |

OTHER PUBLICATIONS

Translation of DE-102014101727.*

* cited by examiner

*Primary Examiner* — Bobby Yeonjin Kim
(74) *Attorney, Agent, or Firm* — Colson Law Group, PLLC

(57) ABSTRACT

The invention relates to a rotor for an agitating mill having a generally cylindrical rotor body, the outer wall of which defines an inner surface of a milling chamber, through which a feed material to be treated flows during operation of the agitating mill. A ceramic ring is arranged at the rotor end of the rotor body, the rotor end being arranged opposite the product inlet of the agitating mill. The invention also relates to an agitating mill comprising the rotor according to the invention, to the use of the rotor according to the invention in an agitating mill for producing dispersions, and to a method for producing the rotor.

11 Claims, 3 Drawing Sheets

WEAR-RESISTANT ROTOR

Figure 1:
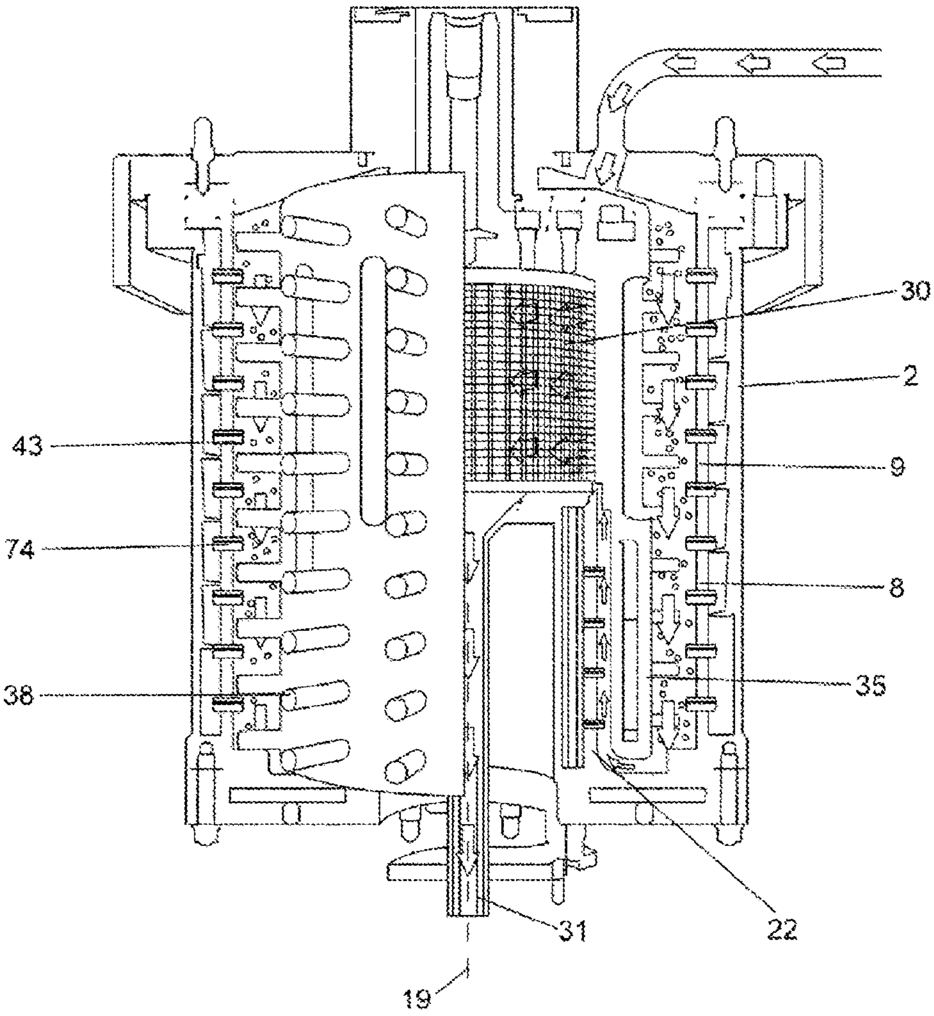

The invention relates to a rotor for an agitating mill, and in particular a wear-resistant, dimensionally stable plastic rotor.

Agitating mills have a wide range of applications with the milling and dispersing of solids in liquids. They are used, for example, in the production of adhesives, printing inks, cosmetics, pharmaceuticals or also for the production of raw materials (in particular silicon) of battery pastes. Usually, a milling chamber is formed in a vertical agitating mill by a rotor rotating around a vertically oriented central longitudinal axis and a stator, in which chamber, where applicable, dispersions are produced using auxiliary milling bodies, for example ceramic balls. For this purpose, milling tools, for example in the form of round pins, can be attached to the rotor and/or to the stator. The feed material is guided via a product feed into the milling chamber, milled there and discharged via a product discharge. Such an agitating mill is known, for example, from EP 1 992 412 A1.

In particular in the production of the raw materials for battery pastes, a fineness of x50=100 to 200 nm must be achieved, which makes long milling times necessary. Due to the abrasiveness of the solid to be processed, significant wear of the process zone in the milling chamber is to be expected. In addition, metallic contamination in the end product is to be avoided, so that, instead of an otherwise typical steel rotor, the use of a metal-free rotor for the agitating mill is preferred.

The use of ceramic and plastic rotors is known in the prior art. However, the production of ceramic rotors is highly expensive and complex in terms of design. Due to their hardness, SSiC or SiSiC, for example, are highly wear-resistant, but therefore also sensitive to breakage. These two ceramics also have very good thermal conductivity, significantly higher than steel. However, the production of large components is highly problematic.

Metallic contamination can also be avoided with the use of plastic rotors. Depending on the feed material, however, this rotor type can undergo rapid mechanical wear. In particular in regions of milling body compression (regions of high energy densities), the plastic material suffers greatly. Moreover, there must always be a check in the forefront of whether or not the plastic to be used for the rotor is compatible with the feed material, so that its chemical resistance is ensured. The generally poor thermal conductivity of the plastics is highly disadvantageous.

An object of the present invention is to provide a cost-effective rotor for an agitating mill which is dimensionally stable and, in particular, resistant to common solvents and can be used in particular for the production of battery pastes. The wet grinding abrasive solids should be made possible without disruptive wear in the end product.

The basic idea of the invention is to use a rotor body for the rotor of an agitating mill, which rotor body has a wear element made of ceramic in the region of high energy densities, in particular in the lower region of the process zone, that is to say at the lower end of the rotor. In particular, in the case of vertically arranged agitating mills at the bottom of the process zone, that is to say in the lower region of the rotor, the gravity and the deflection of the milling bodies by the product solid and the milling bodies in combination with the high rotor speed result in high wear on the rotor. In general, the highest wear in agitating mills occurs at the rotor end, that is to say at the point which is opposite the product inlet.

According to the invention, a rotor is therefore provided which has a generally cylindrical rotor body, the outer wall of which defines an inner surface of a milling chamber through which a feed material to be treated flows during operation of the agitating mill. A ceramic ring is arranged in a region of the rotor with high energy input. This region is the side of the rotor which is opposite the inlet of the product into the agitating mill. In a vertical agitating mill, this is the lower portion of the rotor body. A surface of the ceramic ring forms in particular a portion of the outer wall of the rotor that forms the inner surface of the milling chamber. The portion preferably extends up to milling tools which are arranged on the outer wall of the rotor. Thus, the milling tools can secure the ceramic ring against twisting and/or falling off.

The ceramic ring is preferably joined—in particular screwed, glued or connected by positive interlock—to the rotor body. If according to a preferred embodiment the rotor body is made of plastic, the ceramic ring can also be cast into the rotor body.

The ceramic ring can have a substantially L-shaped cross section, wherein the long side of the L-shaped ceramic ring, i.e., its leg, is arranged on the outer surface of the rotor. Alternatively, the ceramic ring can have a substantially U-shaped cross section, the legs of which are arranged on the outer surface and the inner surface of the rotor.

Preferably, the ratio L/D of the length L of the portion of the outer wall of the rotor, which is formed by the ceramic ring, to the outer diameter D of the rotor is between 0.05 and 0.5. The ratio S1/S2 of the thickness S1 of the portion of the ceramic ring, which forms the outer wall of the rotor, to that of the total rotor wall thickness S2 is preferably between 0.1 and 0.9.

The plastic rotor can have at least one of the following materials: PA, PET, PEEK, PVDF and POM. The ceramic ring can in turn have at least one of the following materials: $ZrO_2$, SSiC, SiSiC and $Si_3N_4$.

The present invention further provides an agitating mill with a rotor according to the invention. According to a known mill, the agitating mill according to the invention further comprises a stator with a stator inner wall, wherein the rotor is arranged within the stator. Furthermore, a product feed and a product discharge are provided, and the milling chamber is formed between the stator inner wall and the outer wall of the rotor. The feed material can be guided via the product feed into the milling chamber and via the product discharge out of the milling chamber.

For a ratio of an outer diameter D of the rotor to an inner diameter D2 of the stator, $0.6 \leq D/D2 \leq 0.95$ is preferable. Furthermore, the agitating mill can have an inner stator arranged within a portion of the rotor, wherein a product discharge is formed between the rotor and an outer wall of the inner stator. For a ratio of an outer diameter d22 of the inner stator to an inner diameter d1 of the rotor, $0.8 \leq d22/d1 \leq 0.98$ is preferable.

The invention further relates to the use of the rotor according to the invention in an agitating mill for producing dispersions, in particular a battery paste and a method for producing the rotor. The method comprises the step of joining—in particular by gluing, screwing or positive interlocking connection—a ceramic ring with the rotor body.

Figure 2:
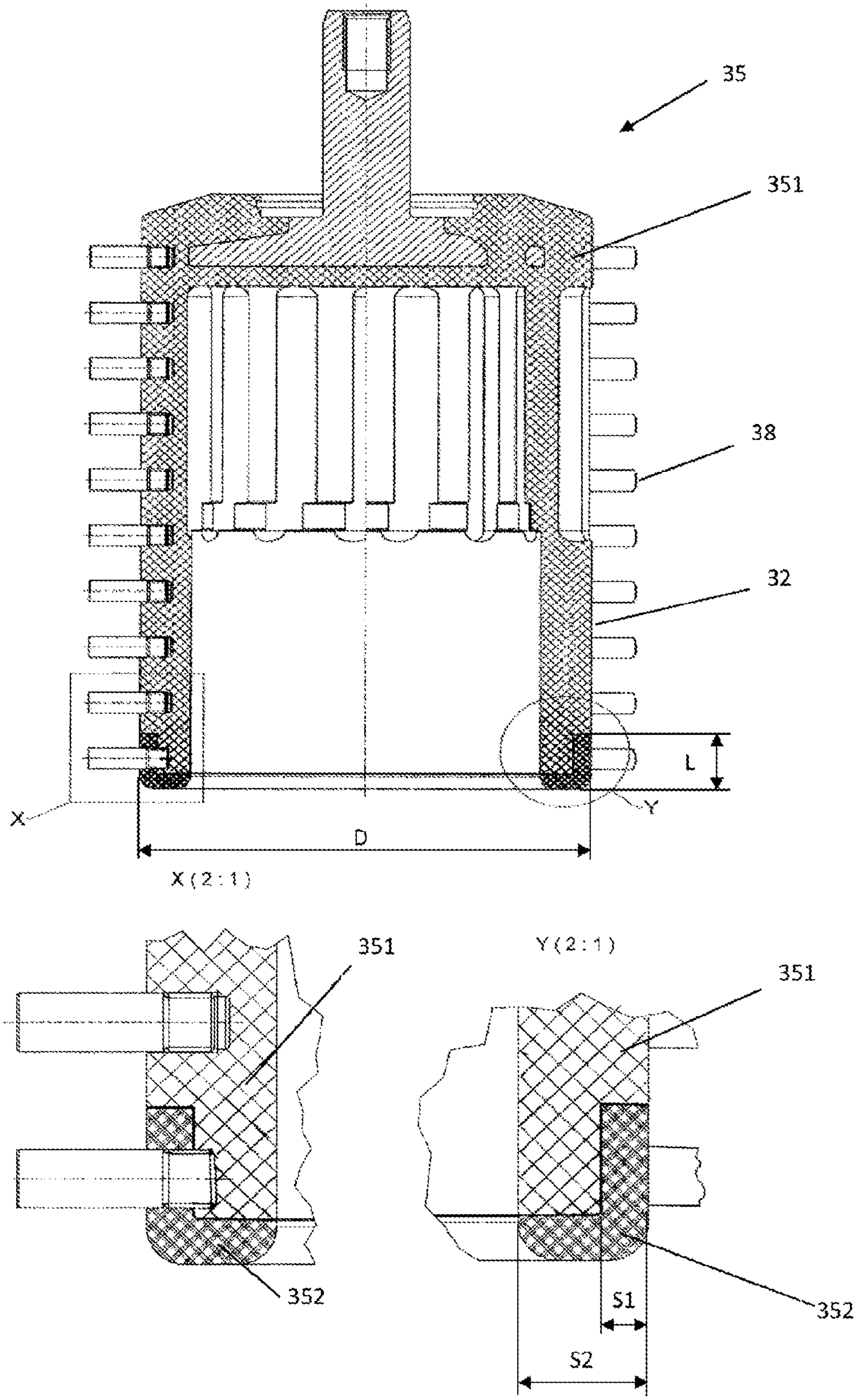
Figure 3:
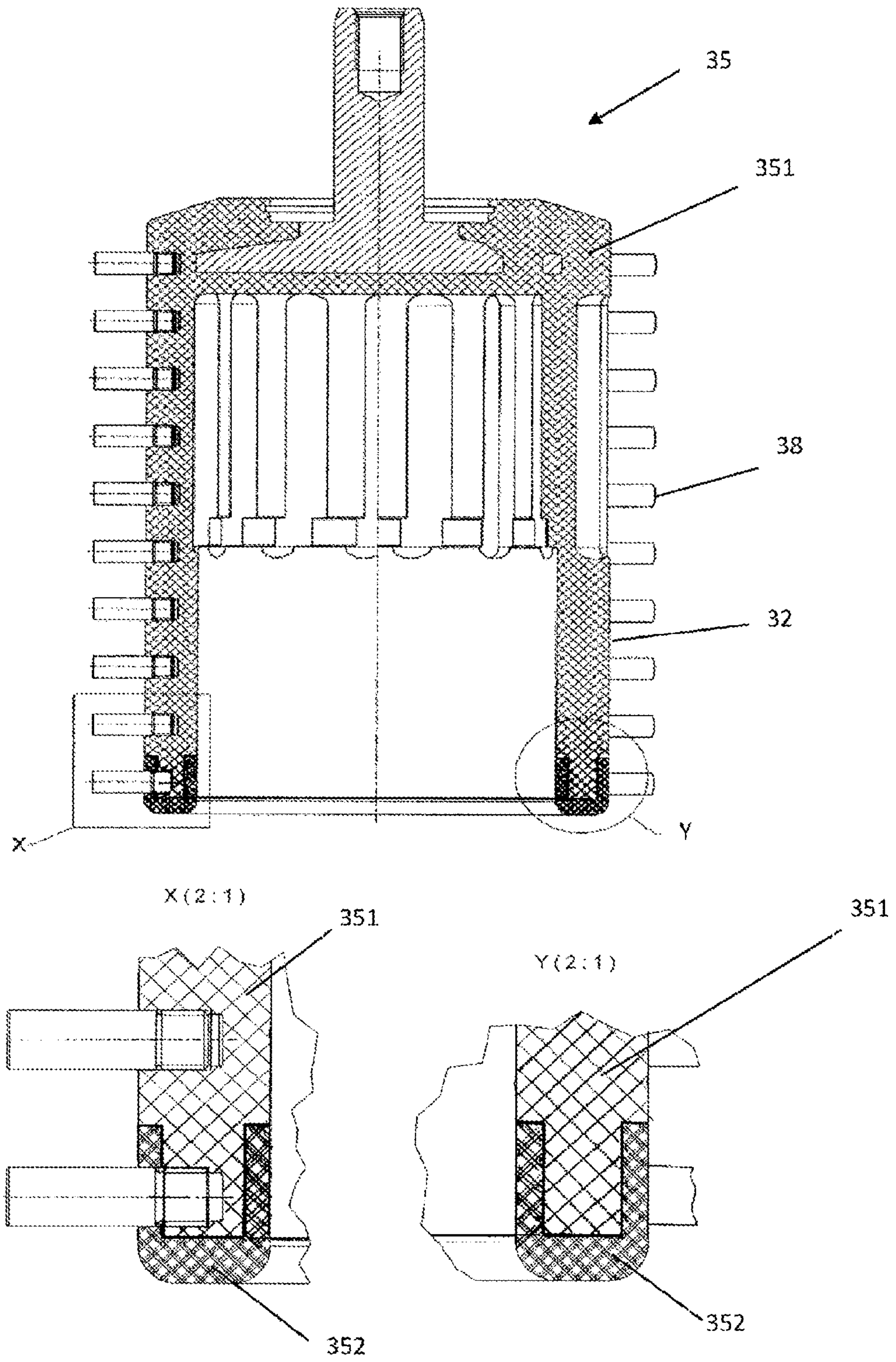

The invention is described in more detail below with reference to the figures, wherein FIG. 1 is a cross-sectional view of a vertical agitating mill of the prior art, FIG. 2 is a cross-sectional view of a rotor for a vertical agitating mill according to an embodiment of the present invention, and FIG. 3 is a cross-sectional view of a rotor for a vertical agitating mill rotor according to another embodiment of the present invention.

FIG. 1 shows by way of example a detail of a vertically arranged agitating mill according to the prior art. The agitating mill shown in FIG. 1 has a mill container or stator 2 with an internal milling chamber 8 in a conventional manner. The milling chamber 8 is at least partially filled with milling elements 43. The stirrer mill furthermore comprises an inner stator 22 and a rotor 35 that can rotate about a center longitudinal axis 19. First tools 38, which project into the milling chamber 8, are attached to the rotor 35. Second tools 74, which project into the milling chamber 8, are attached to the inner wall 9 of the container or stator. The processed feed material is guided through a gap between the rotor 35 and the inner stator 22 to form a protective screen 30, which holds the milling body 43 and flows off via a discharge line 31.

FIG. 2 shows a cross-sectional view of a rotor for a vertical agitating mill as shown in FIG. 1. The rotor according to the shown embodiment of the invention has a general cylindrical rotor body 351 with an outer wall 32. The rotor body 351 with the outer diameter D can be made of plastic or steel, wherein plastic is preferred. Together with the stator shown in FIG. 1, the rotor forms a milling chamber during operation of the agitating mill through which the feed material to be treated flows.

The greatest wear on the rotor of a vertical agitating mill is generally caused at the lower region of the rotor, namely the region in which high energy densities occur due to gravity and the deflection of the feed material with the milling bodies in combination with the high rotor speed. In general in agitating mills, both in vertical and horizontal agitating mills, the region in which the greatest wear is caused is the region which is opposite the product inlet during operation. According to the present invention, an annular wear ring is provided precisely in this region and is manufactured from a hard and therefore highly wear-resistant ceramic material. In this case, for example, the materials are $ZrO_2$, SSiC, SiSiC and $Si_3N_4$. Thus, the rotor 35 can be manufactured for the most part from a cost-effective rotor base body, wherein, however, the wear-prone portions are replaced by the wear-resistant ceramic material.

As shown in the detail view denoted as Y in FIG. 2 and additionally enlarged, the ceramic ring 352 can have substantially an L-shaped profile, wherein the short side of the L form the underside and the long side, i.e., the legs of the L, form the lower portion of the outer side 32, where the greatest wear is caused. The lower portion of the length L of the outer side 32 and the underside of the rotor with the overall wall thickness S2 are thus formed by the ceramic ring 352.

The ceramic ring 352 is joined to the rotor body, for example screwed, glued or, in the case of a plastic rotor body, also cast into the plastic. On the outer side 32 of the rotor, the ceramic ring 352 preferably extends up to the lowest row of milling tools 38, as shown in the section of FIG. 2 designated X. Thus, the ceramic ring 352 can additionally be secured by the tools 38 in particular against twisting or falling off.

For the wall thickness S1 of the ceramic ring to the total wall thickness S2 of the rotor, $0.1<S1/S2<0.9$ is preferable.

FIG. 3 shows a cross-sectional view of a rotor according to another embodiment of the present invention. As in FIG. 2, a wear element made of ceramic is attached to the lower portion of the rotor body 351. According to the embodiment shown in FIG. 3, this is again realized in the form of a ceramic ring 352, which, unlike in FIG. 2, has a substantially U-shaped profile, so that, in addition to the underside and a portion of the outer side 32, a portion of the surface of the inner side of the rotor, i.e., a portion of the product discharge, is also reinforced by the wear element via the second leg of the U. This is shown more precisely again in the detail denoted by Y in FIG. 3. On the outer side 32 An, the ceramic ring 352 can again extend at least up to the lowermost row of the milling tools 38, as shown in the section of FIG. 3 designated with X.

The invention further provides an agitating mill that uses the rotor according to the invention. For this purpose, only the rotor 35, as shown by way of example in FIG. 1, is replaced by a rotor according to the invention, as shown for example in FIG. 2 or 3. Typical expansions of such an agitating mill yield values between 0.6 and 0.95 for a ratio of an outer diameter of the rotor 35 to an inner diameter of the stator 2. The ratio of the outer diameter of the inner stator 22 to the inner diameter of the rotor 35 is, for example, 0.8 to 0.98.

The rotor according to the invention can be produced in particular by joining a ceramic ring 352 to the rotor body 351. This can take place in particular by gluing, screwing or positive interlocking connection. If the rotor body 352 is made of plastic, the ceramic ring 352 can also be cast into the plastic body 351.

The rotor and the agitating mill using this rotor according to the present invention are suitable in particular for the production of dispersions which require high fineness, for example fineness of x50=100 to 200 nm, as a result of which long milling times are necessary, wherein these dispersions have to be kept as free as possible of metallic contaminations. This is the case, for example, for production of raw materials of battery pastes.

The invention claimed is:

1. A rotor for an agitating mill, comprising:

a generally cylindrical rotor body, an outer wall of which defines an inner surface of a milling chamber through which a feed material to be treated flows during operation of the agitating mill, a ceramic ring arranged at a rotor end of the rotor body, wherein the rotor end is arranged opposite a product inlet of the agitating mill, wherein a surface of the ceramic ring forms a portion of the outer wall of the rotor forming the inner surface of the milling chamber, wherein the portion extends to milling tools arranged on the outer wall of the rotor, and the ceramic ring is secured by the milling tools against twisting and/or falling off.

2. The rotor according to claim 1, wherein the rotor is configured for use in a vertical agitating mill.

3. The rotor according to claim 1, wherein the ceramic ring is joined, via screwed or joined by a positive interlocking connection, to the rotor body.

4. The rotor according to claim 1, wherein the rotor body is made of plastic.

5. The rotor according to claim 1, wherein the ceramic ring has a substantially L-shaped cross section and wherein the leg of the L-shaped ceramic ring is arranged on the outer surface of the rotor.

6. The rotor according to claim 1, wherein the ceramic ring has a substantially U-shaped cross section and wherein the legs of the U-shaped ceramic ring are arranged on the outer surface and the inner surface of the rotor.

7. The rotor according to claim 1, wherein the ceramic ring has a substantially U-shaped cross section and wherein the legs of the U-shaped ceramic ring are arranged on the outer surface and the inner surface of the rotor.

8. The rotor according to claim 1, wherein the ratio S1/S2 of the rotor wall thickness S1 to the thickness S2 of the portion of the ceramic ring forming the outer wall of the rotor is between 0.1 and 0.9.

9. The rotor according to claim 1, wherein the rotor body has at least one of the following materials: PA, PET, PEEK, PVDF and POM.

10. The rotor according to claim 1, wherein the ceramic ring has at least one of the following materials: $ZrO_2$, SSiC, SiSiC and $Si_3N_4$.

11. An agitating mill comprising: a rotor, comprising:

a generally cylindrical rotor body, an outer wall of which defines an inner surface of a milling chamber through which a feed material to be treated flows during operation of the agitating mill, a ceramic ring arranged at a rotor end of the rotor body, wherein the rotor end is arranged opposite a product inlet of the agitating mill, wherein a surface of the ceramic ring forms a portion of the outer wall of the rotor forming the inner surface of the milling chamber, wherein the portion extends to milling tools arranged on the outer wall of the rotor, and the ceramic ring is secured by the milling tools against twisting and/or falling off;

a stator having a stator inner wall, wherein the rotor is arranged within the stator, a product feed and a product discharge, wherein a milling chamber is formed between the stator inner wall and the outer wall of the rotor, wherein feed material can be guided via the product feed into the milling chamber and via the product discharge out of the milling chamber.

* * * * *